(12) United States Patent
Rubio et al.

(10) Patent No.: US 10,946,659 B2
(45) Date of Patent: Mar. 16, 2021

(54) APPLYING FIRST AND SECOND WEAVING MASKS

(71) Applicant: Hewlett-Packard Development Company, L.P., Houston, TX (US)

(72) Inventors: Leticia Rubio, Sant Cugat del Valles (ES); Utpal Sarkar, Sant Cugat del Valles (ES); Xavier Quintero Ruiz, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 65 days.

(21) Appl. No.: 16/301,716

(22) PCT Filed: Jul. 29, 2016

(86) PCT No.: PCT/US2016/044642
§ 371 (c)(1),
(2) Date: Nov. 14, 2018

(87) PCT Pub. No.: WO2018/022078
PCT Pub. Date: Feb. 1, 2018

(65) Prior Publication Data
US 2019/0291435 A1    Sep. 26, 2019

(51) Int. Cl.
*B41J 2/155* (2006.01)
*B41J 2/21* (2006.01)
(Continued)

(52) U.S. Cl.
CPC ............... *B41J 2/155* (2013.01); *B41J 2/14* (2013.01); *B41J 2/2146* (2013.01); *G06K 15/107* (2013.01)

(58) Field of Classification Search
CPC . B41J 2/155; B41J 2/14; B41J 2/2146; G06K 15/107
See application file for complete search history.

(56) References Cited

U.S. PATENT DOCUMENTS

| 7,871,145 B1 | 1/2011 | Enge |
| 8,721,033 B2 | 5/2014 | Mongeon et al. |

(Continued)

FOREIGN PATENT DOCUMENTS

| WO | WO-2015178900 A1 | 11/2015 |
| WO | WO-2015185134 A1 | 12/2015 |

OTHER PUBLICATIONS

Cristina, R-R. et al., Aerodynamic Effects in Industrial Inkjet Printing, Jan. 2015, 2 pages.

*Primary Examiner* — Henok D Legesse
(74) *Attorney, Agent, or Firm* — HP Inc. Patent Department

(57) ABSTRACT

A printing apparatus comprises a printhead and a controller. The printhead includes dies, each die comprising rows of nozzles, wherein, in an overlapping region, the rows of nozzles of two dies overlap in a first direction, in which a relative movement between the printhead and a print medium takes place during operation of the printing apparatus. The controller is to apply a first weaving mask to a first row of nozzles of a first die and a second weaving mask to a second row of nozzles of the first die, the second weaving mask being different from the first weaving mask, the weaving masks defining, independent of print data, which of the nozzles of the corresponding row are to be used for printing in the overlapping region.

16 Claims, 10 Drawing Sheets

(51) Int. Cl.
*B41J 2/14* (2006.01)
*G06K 15/10* (2006.01)

(56) References Cited

U.S. PATENT DOCUMENTS

| | | |
|---|---|---|
| 2003/0063153 A1 | 4/2003 | Bauer et al. |
| 2011/0298853 A1 | 12/2011 | Takamiya et al. |
| 2011/0316911 A1* | 12/2011 | Ishikawa .............. G06K 15/102 347/9 |
| 2017/0173984 A1* | 6/2017 | Borrell Bayona ..... B41J 25/308 |

* cited by examiner

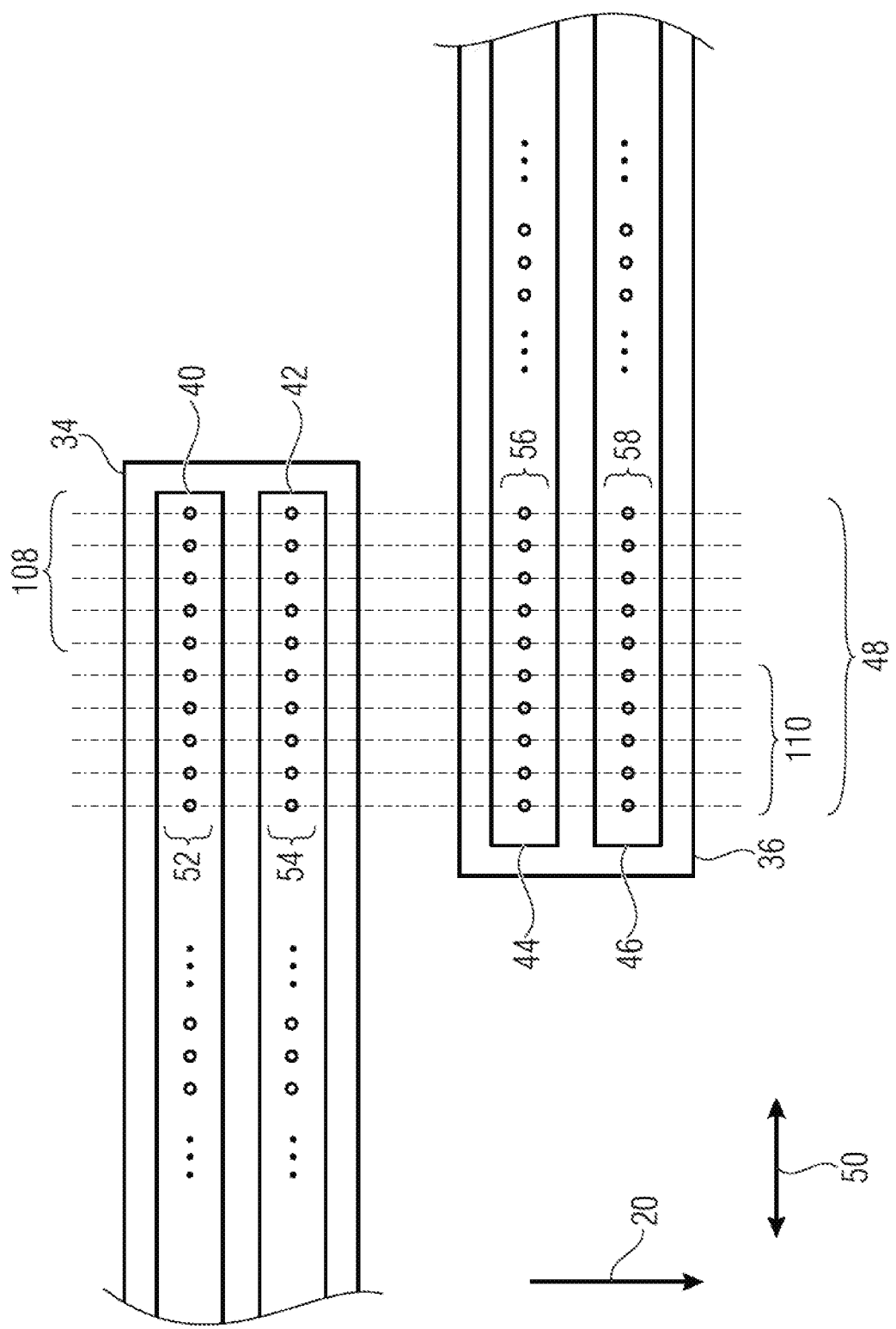

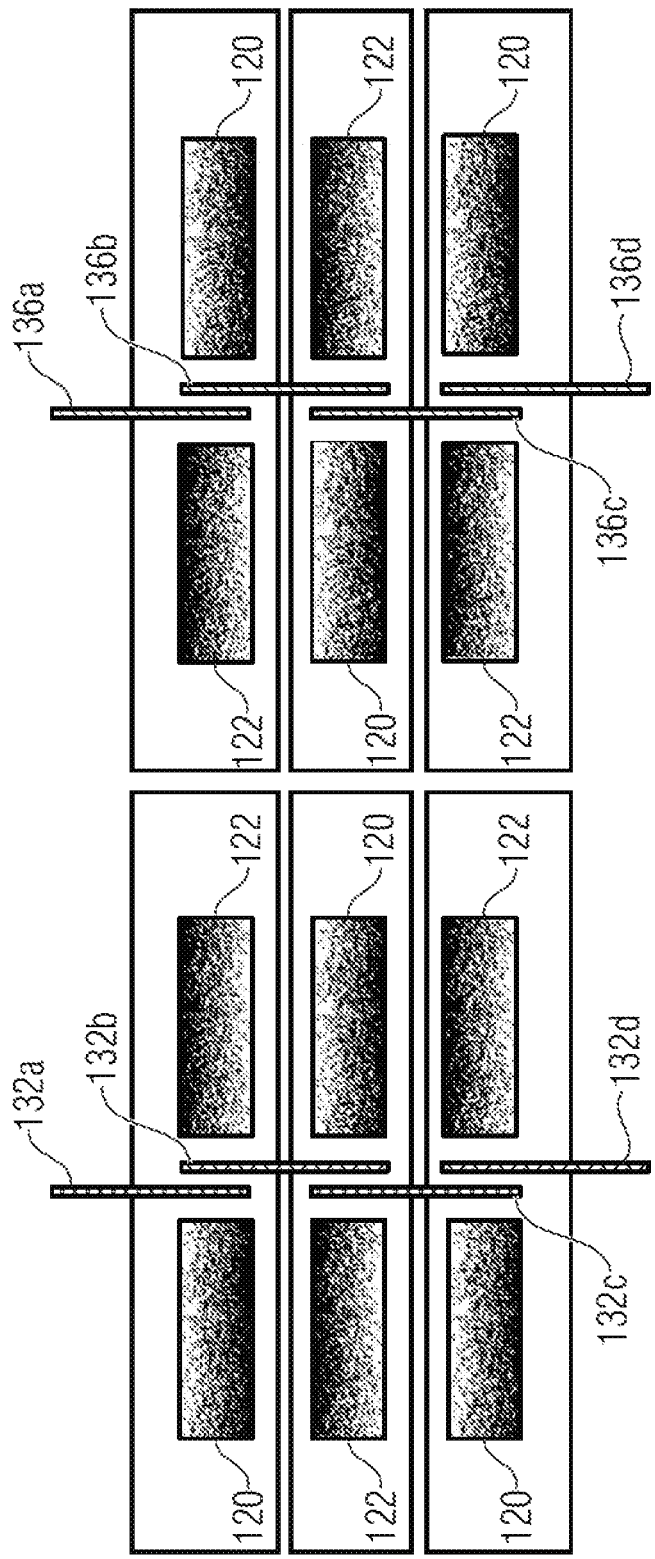

APPLYING FIRST AND SECOND WEAVING MASKS

BACKGROUND

Some printers, such as page-wide printers, comprise multiple printhead dies arranged in a staggered manner so that there is an overlap area between adjacent printhead dies. The overlap area is sometimes called stitching zone and provides nozzle redundancy, so the printer can choose between two different nozzles to fire the resultant dot in order to address visible defects due to placement errors of the printhead dies or printheads.

BRIEF DESCRIPTION OF THE DRAWINGS

Examples of the disclosure are described with reference to the drawings which are provided for illustrative purposes, in which:

FIG. 3 a schematic view of an example of an overlap area;

FIGS. 8a and 8b schematic views of weaving masks according to an example;

DETAILED DESCRIPTION

Figure 1:
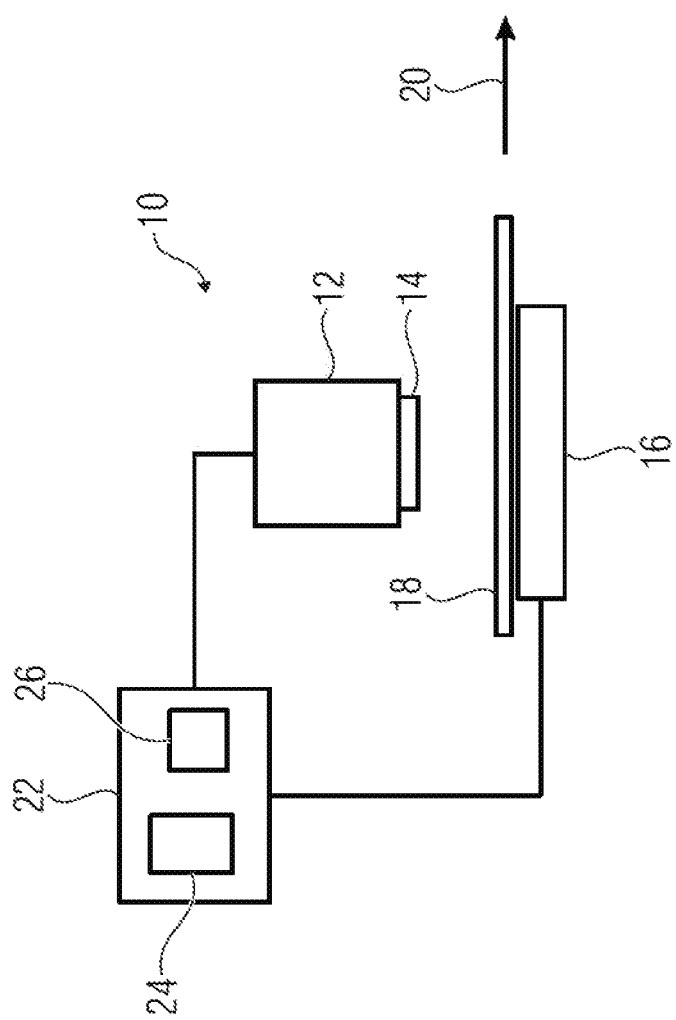
FIG. 1 is a schematic view of an example of a printing apparatus.

The following detailed description refers to the accompanying drawings. Wherever possible, the same reference numbers are used in the drawings and the following description to refer to the same or similar parts. While several examples are described in this document, modifications, adaptions, and other implementations are possible. Accordingly, the following detailed description does not limit the disclosed examples. Instead, the proper scope of the disclosed examples may be defined by the appended claims.

It is noted that examples of methods and apparatus described herein relate to printhead architectures in which print head dies having a plurality of rows of nozzles overlap in a first direction. The first direction is a direction, in which a relative movement between the printhead and a print medium takes place during operation of the printing apparatus. In examples, the first direction may be orthogonal to the direction, in which the rows of nozzles on the printhead dies extend. In examples, the first direction may be a media advance direction, such as in page wide printers in which a print medium is moved past a page wide printhead bar. In examples, the first direction may be orthogonal to a media advance direction, such as in scanning printers in which a printhead is scanned (moved) across a print medium in a direction orthogonal to the media advance direction.

Examples described herein relate to printhead architectures with four rows of nozzles per printhead die. In examples, each row of nozzles is associated with a different color, such as cyan, magenta, yellow and black (CMYK).

Examples herein may relate to page-wide printing apparatuses using an array of printheads and examples may relate to page-wide printing apparatuses using a single printhead with an array of nozzles. Examples herein may relate to 2D printing apparatuses printing two-dimensional images. Examples herein may relate to 3D printing apparatuses printing on a bed of build material.

It is noted that the methods and apparatus described in the examples herein are made in the context of a page-wide array printing apparatus comprising at least first and second printhead dies that overlap in the first direction. Some of the examples will be described in relation to a printing apparatus comprising eight printheads, wherein six printhead dies are located in a single printhead, and with each printhead die comprising rows of nozzles, for example four rows. It is noted, however, that the examples are not limited to these examples and that other configurations can be used. For example, a page-wide array printing apparatus may comprise a different number of printhead assemblies forming the page width, and/or different numbers of printhead dies on a print head assembly, as well as a different number of rows of nozzles on each printhead die. Generally, a printhead die may represent a component comprising a surface, in which all nozzles of the printhead die are formed.

FIG. 1 shows a schematic view of an example of a printing apparatus 10. The printing apparatus comprises a printhead assembly 12 comprising a print bar 14 or several print bars 14. The print bar may extend across the width of a print zone and, hence, may have substantially the same length as the complete printhead assembly 12. The printing apparatus 10 comprises a transport mechanism 16 which, in use, is to transport a print medium 18 to be printed upon through a printing zone below the printhead assembly 12. The transport mechanism 16 is to transport the print medium through the print zone in a media advance direction 20. The printing apparatus 10 comprises a controller 22, which is to control the printhead assembly 12 to fire nozzles of the print bar 14 and to control movement of the print media 18 through the print zone. Instead of one controller 22, separate controllers could be provided for the print media transport mechanism 16 and the printhead assembly 12. The controller 22 may include a processor 24 and a memory 26. The processor 24 may have access to memory 22. Images or drops for the printing apparatus 10 can be stored in the memory 26 until they are printed onto the print media by the printing apparatus. Controller 22 may store program modules for implementing the processes according to examples as described herein.

Figure 2:
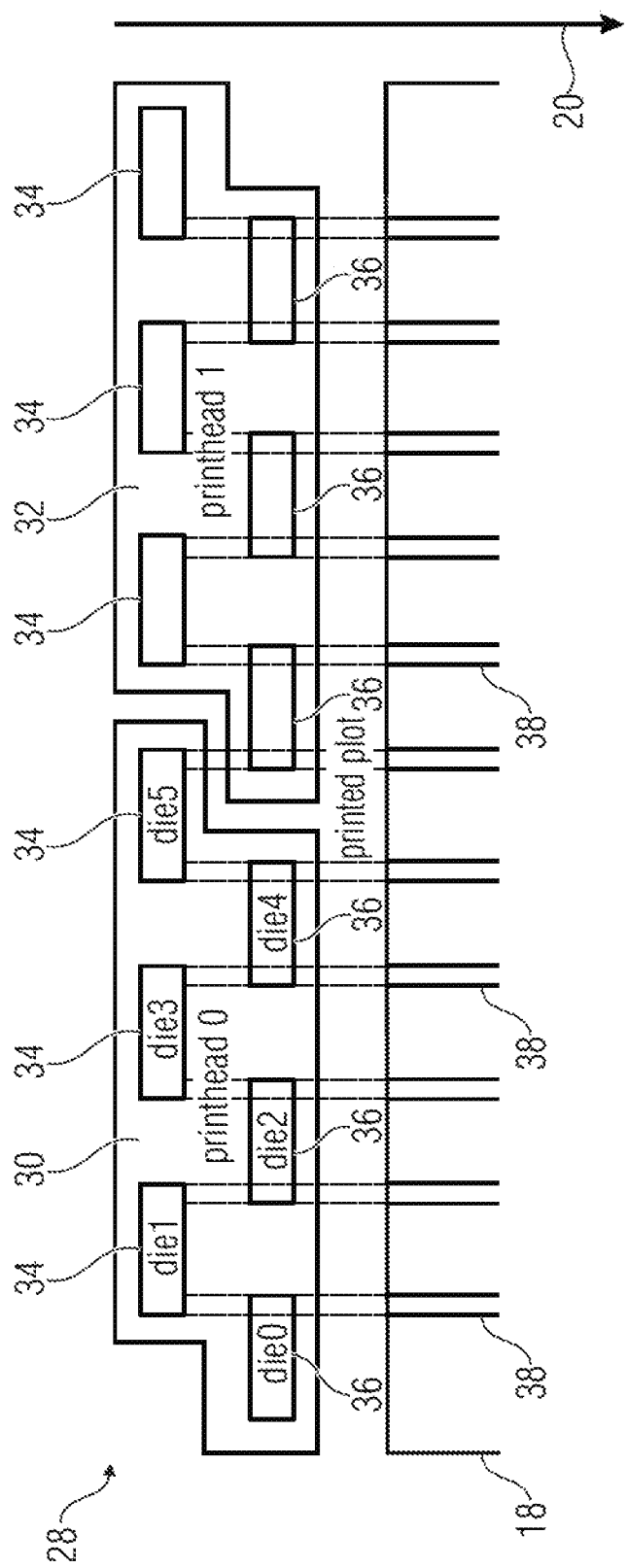
FIG. 2 is a schematic view of an example of a printing apparatus comprising overlap areas between adjacent printhead dies.

An example of a print bar which can be used in a printing apparatus as shown in FIG. 1 is schematically shown in FIG. 2. FIG. 2 illustrates how die stitching may appear along a printed plot.

FIG. 2 shows a print bar 28, which comprises two printheads 30 and 32. In practice, print bar 28 may have a different number of printheads, such as eight printheads. The printheads may cover the whole media width. Every printhead 30 comprises 6 printhead dies arranged in two rows along the length of the printing bar. Dies 34 form a first row of dies and dies 36 form a second row of dies. When considering media advance direction 20, the medium will move past the row of dies 34 first and, therefore, dies 34 may be designated leading dies and dies 36 may be designated trailing dies. Dies 34 and 36 are arranged in a staggered manner so that the dies overlap in the media advance direction. Generally, adjacent dies overlap when viewed in a first direction, in which relative movement between a print head, such as print heads 30, 32, and a print medium takes place during printing. In the example shown in FIG. 2, the first direction is the media advance direction.

Corresponding overlapping regions are indicated in FIG. 2 by broken lines. Each die comprises rows of nozzles (drop ejecting elements), wherein, in the overlapping region, the rows of nozzles of respective two dies (a leading die 34 and a trailing die 36) overlap in the first direction 20. In the overlapping region, nozzles of a particular printhead die are redundant to nozzles of another printhead die. Shown in FIG. 2 is a printed plot and the print medium 18, wherein the overlap regions 38, also referred to as die stitching regions, are schematically indicated as respective stripes or zones 38 on the print medium 18.

As far as the overlapping region is concerned, reference is made to FIG. 3, for example, which shows a portion of a leading printhead die 34 and a portion of a trailing printhead die 36. Each die comprises two rows of nozzles 40, 42, 44 and 46. In an overlapping region 48, the rows of nozzles 40 to 46 overlap in the first direction 20. Sometimes, the rows of nozzles are called trenches or slots of the printheads. The rows of nozzles extend in a direction 50 perpendicular to the first direction 20. In examples, one row of nozzles (trench, slot) is provided for each color, for example one for cyan, one for magenta, one for yellow and one for black (CMYK).

In the overlapping region 48, there is nozzle redundancy, wherein a controller may choose between two nozzles from different (adjacent) dies to fire the resultant dot. In the example shown in FIG. 3, a set 52 of nozzles in row 40 is redundant to a set 56 of nozzles in row 44. Likewise, a set 54 of nozzles in row 42 is redundant to a set 58 of nozzles in row 46. The nozzles are redundant such that the first set and the second set of nozzles are capable of ejecting drops on the same area of a print medium, e.g., the overlapping region 48. Redundant nozzles may be regarded as sharing a printing axis (i.e., an axis extending in a direction substantially parallel to the medium advance direction 20 during printing) such that target pixels corresponding to the printing axis are capable of being printed by either printhead die 34 or printhead die 36. The corresponding printing axes are indicated in FIG. 3 by broken lines. As an example, referring to FIG. 3, the printer can choose one of the nozzles in row 40 or one of the nozzles in row 44, which are arranged on the same print axis. In examples, redundant nozzles are arranged in rows having the same relative position on the respective die in the first direction. In examples, redundant nozzles are arranged in rows associated with the same color on the respective die.

In order to split the task of printing in the overlapping region between two dies, such as dies 34 and 36 in FIG. 3, masks may be used, which are sometimes called "weaving masks". A weaving mask may define for each row of nozzles which of the nozzles are to be used for printing in the overlapping region and which are not (independent of print data).

Generally, weaving masks may be two-dimensional binary arrays which indicate independent of print data which of the nozzles of the corresponding row is to be used for printing in the overlapping region, such as overlapping region 48 in FIG. 3. Such weaving masks are independent of the image to be printed. There is a 1:1 relationship between rows of the weaving mask and the number of nozzles of the row in the overlap area. The second dimension of the weaving mask concerns consecutive pixels in the first direction. In other words, each row of the weaving mask indicates for a respective nozzle how it is to be used during a number of subsequent firings to generate consecutive pixels in the first direction. The weaving mask is used repeatedly in time while the print medium is moved past the print bar. The weaving mask may be one-dimensional and may have a single column. This indicates that the nozzles to be used for printing in the overlapping region do not change during a relative movement between the nozzles and the print medium in the first direction.

Generally, a pair of weaving masks is associated with the dies overlapping in the first direction. If viewing the rows of nozzles arranged in an up and down direction, the first mask of the pair may be, by convention, associated with the row of nozzles, which bottom nozzles are involved in the overlap region, and the second mask may be associated with the row of nozzles, which top nozzles are involved in the overlap region. If turning the arrangement of FIG. 3 clockwise by 90°, the bottom nozzles of rows 40 and 42 are involved in the overlap region and the top nozzles of rows 44 and 46 are involved in the overlap area.

There is a range of possible dot distributions that may be defined by the weaving masks. Different dot distributions may result in different artefacts in the overlapping area.

Figure 4A:
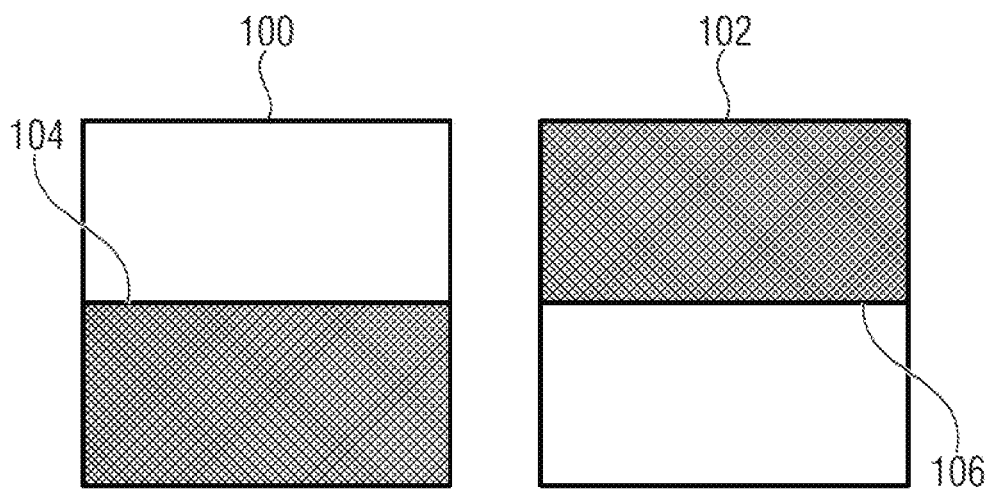
FIGS. 4a and 4b schematic views of example complementary weaving masks.

Generally, complementary weaving masks may be used for rows of nozzles which are associated with the some color (printing fluid colorant, such as ink colorant) on adjacent dies. In examples, a sharp complementary weaving mask may be used. An example of sharp complementary weaving masks is shown in FIG. 4a. FIG. 4a shows a pair of complementary weaving masks 100 and 102, which are split in two parts at sharp border lines 104, 106. In these weaving masks, the distribution of dots printed from each printhead die in the die stitching zone (overlapping region) sharply jumps down (from 1 to 0) from top to bottom for one die and jumps up (from 0 to 1) in a complementary way for the adjacent die across the die stitching zone. In examples, zeros are represented by white and ones are represented by black. Referring to FIG. 3, weaving mask 100 shown in FIG. 4a may be associated with rows 40 and 44 and weaving mask 102 may be associated with rows 42 and 46. The sharp border lines 104 and 106 may be in the middle of the overlapping region so that the weaving masks 100 and 102 define that nozzles 108 of rows 40 and 44 are to be used for printing in the overlapping region and nozzles 110 of rows 42 and 46 are to be used for printing in the overlapping region.

Figure 4B:
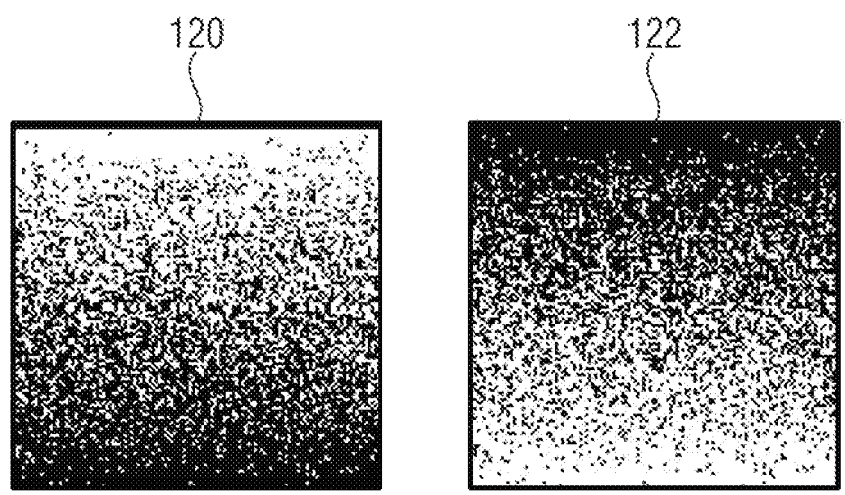

Another approach of a pair of complementary weaving masks 120 and 122 is shown in FIG. 4b. In these weaving masks, the number of dots printed from each printhead die in the die stitching zone gradually increases from one end to the other (such as from top to bottom) for one die and decreases in a complementary way for the adjacent die, throughout the die stitching zone (overlapping region). This forms a taper. The taper may be randomized for one mask and is complementary thereto in the other mask. Thus, the weaving masks shown in FIG. 4b may be referred to as random taper weaving masks. In the example of FIG. 3, weaving mask 122 may be associated with die 34 and weaving mask 120 may be associated with die 36.

Weaving strategies can address different kinds of image quality defects affecting the stitching area in presence of different kinds of errors due to a variability of the printing apparatus itself. It is to be noted that different weaving strategies can be specified in the print-mode configuration for different colorants and even for different overlap regions within the same colorant.

In examples, a page wide array printer may include a single bar of printheads covering the whole paper width. For example, a printing apparatus may include one bar of 8 printheads, every one of which has six dies, each one with four rows of nozzles (CMYK), which gives a total of forty-seven overlapping regions representing stitching areas where four different colorants interact. As described above, die stitching areas are zones with nozzle redundancy between consecutive dies. With a page wide array printer, a whole page can be printed in a continuous media movement, which means that all print-modes for all quality levels may be single pass print-modes. Such printers may print fast but it may be more difficult to hide defects caused by dot placement errors resulting of the variability of the printer itself.

Ink interactions and different ink properties may produce a disturbed distribution between the drops printed by an end (such as the bottom) of one die and the adjacent end (such as the top) of the next die. In the disturbed distribution, the spread, the distance between drops, and the drop shape may be affected. Grain may become more visible when several ink colorants interact. Interaction between different colorants may be maximized in case of one-pass print modes where all drops fired by nozzles in the overlap areas are spat onto the media closely in time according to hardware design and in the same pass.

Figure 5:
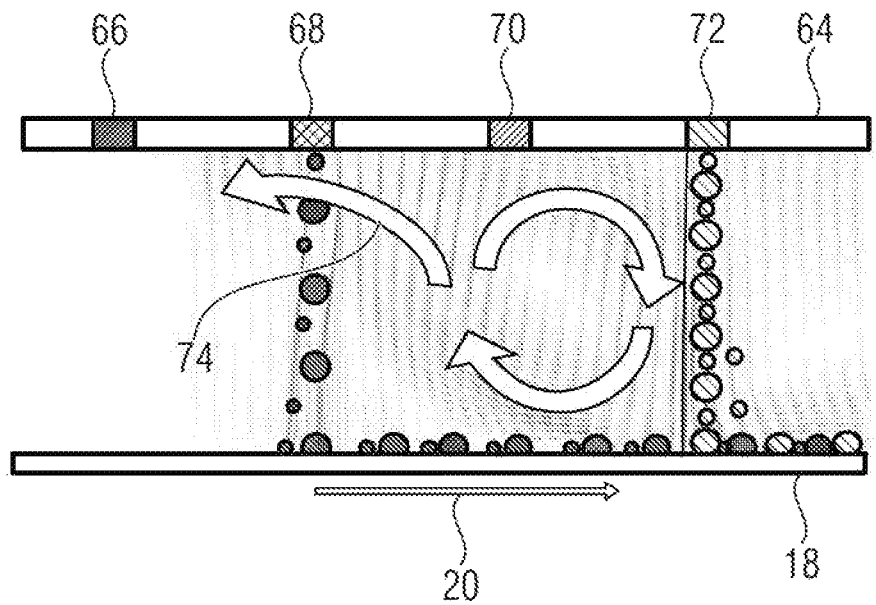
FIG. 5 a schematic view of drops ejected by different rows of nozzles according to an example.
Figure 6:
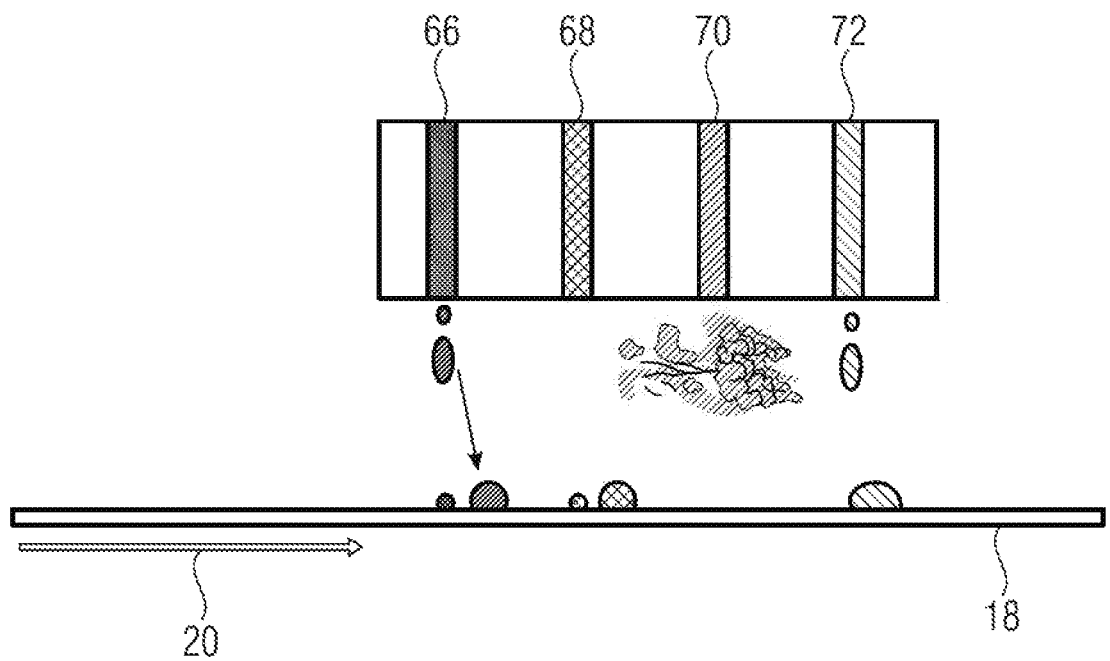
FIG. 6 a schematic view for illustrating generation of satellite droplets according to an example.

FIG. 5 shows a schematic cross-sectional side view of a printhead die 64 comprising four rows of nozzles (slots). Nozzle 66 belongs to a black slot, nozzle 68 belongs to a magenta slot, nozzle 70 belongs to a cyan slot, and nozzle 72 belongs to a yellow slot. Several slots within the same die, such as die 64, may maximize the proximity of drops of several colorants being fired at the same time. Drops fired by one of the slots combined with the motion of the print medium 18 (indicated by arrow 20 representing the media advance direction) may change the air flows, thus affecting the trajectory of drops fired from other slots in the same die. For example, in FIG. 5, drops fired from nozzle 72 in the yellow slot generate a thermal ink jet wind (TIJ wind) which is indicated in FIG. 5 by arrows 74. As can be derived from FIG. 5, the TIJ wind generated by the yellow nozzles affects the trajectory of magenta drops fired by nozzle 68 in the magenta slot. As shown in FIG. 6, this may result in drops split into a main drop and several satellites due to TIJ wind effects. TIJ wind may affect differently different parts of the dies causing different kinds of artefacts. The deflection on the trajectory of the droplets may happen in a different manner at the middle of the die than at the sides thereof. It may not be as strong at the sides because the recirculation may generate a vortex that has its highest velocities, and therefore lowest pressures, near the end of the die. This low pressure zone may modify the recirculation of the air, resulting in less interaction between the air flow and the jet. Thus, artefacts may be caused in areas printed by the central part of the die and may be caused by the same phenomenon in zones of the image printed by the end of the die, by nozzles in the stitching area. Aerodynamics may also affect the die stitching artefact. The described defects are produced by the same aerodynamic phenomenon. Non-circular dots caused by small satellite drops landing out of the imprint area of the main drop may produce dark bands along different areas of the printed image due to the exposition to TIJ wind.

The greater the printing speed is, the bigger the change in the air flow and more visible the artefact may be. Deformed dots may cause darker areas in parts of the image printed by the middle of a die. As indicated above, printing speed, the main value proposition of a page wide array printer, may be a substantial contributor in the generation of the TIJ wind causing the defect. Also pen to paper space (PPS) and trench position may contribute in the generation of TIJ wind. In particular, the distance between slots (i.e., rows of dots or trenches) influences which slot is affected by TIJ winds from another slot, see FIG. 5, for example. In FIG. 5, slot distance, i.e., the distance between adjacent rows of nozzles, is such that the effect is worse when the slot distance is two. Thus, considering an order of trenches of KMCY, the artefact may be made more visible for magenta and yellow on the one hand and black and cyan on the other hand. In particular, TIJ winds may result in darker edges producing an image quality defect affecting the boundary of the stitching area. Such defects occurring at the extremes of the dies may be particularly disturbing because the die stitching zones are susceptible to image quality defects. Examples of the present disclosure concern image quality in these stitching zones.

According to examples, the present disclosure provides a printing apparatus comprising a printhead and a controller. The printhead includes dies, each die comprising rows of nozzles, wherein, in an overlapping region, the rows of nozzles of two dies overlap in a first direction. The first direction may be a direction in which a relative movement between the printhead and a print medium takes place during operation of the printing apparatus. The controller is to apply a first weaving mask to a first row of nozzles of a first die and a second weaving mask to a second row of nozzles of the first die, the second weaving mask being different from the first weaving mask, the weaving masks defining, independent of print data, which of the nozzles of the corresponding row are to be used for printing in the overlapping region.

In examples, the printing apparatus may be a printing apparatus as described above with reference to FIG. 1. In examples, the weaving masks may be weaving masks as described above with reference to FIGS. 4a and 4b.

Referring to FIG. 3, in examples, a first weaving mask may be applied to row 40 of die 34 and a second weaving mask may be applied to row 42 of die 34. Likewise, a first weaving mask may be applied to row 44 of die 36 and a second weaving mask different from the first weaving mask may be applied to row 46 of die 36. Thus, according to examples, different weaving masks are applied to different rows of nozzles provided on the same die, i.e., provided on the same chip. In addition, different weaving masks, such as complementary weaving masks, may be applied to the respective rows including redundant nozzles on the different dies. For example, complementary weaving masks may be applied to rows 40 and 44 (the nozzles of which represent redundant nozzles) and to rows 42 and 46 (the nozzles of which represent redundant nozzles).

In examples, applying the first weaving mask to the first row of nozzles of the first die and the second weaving mask to the second row of nozzles of the first die permits separating in time the moment at which the respective nozzles in the first row and the second row fire so that effects of TIJ wind in the overlapping region can be mitigated. In examples, the weaving masks applied to different slots on the same die may be to maximize the distance between drops fired by the rows of nozzles, which cause the wind, and slots in which the drops are affected by this wind. Examples described herein define an optimal weaving strategy for rows of slots affected by TIJ winds.

Figure 7:
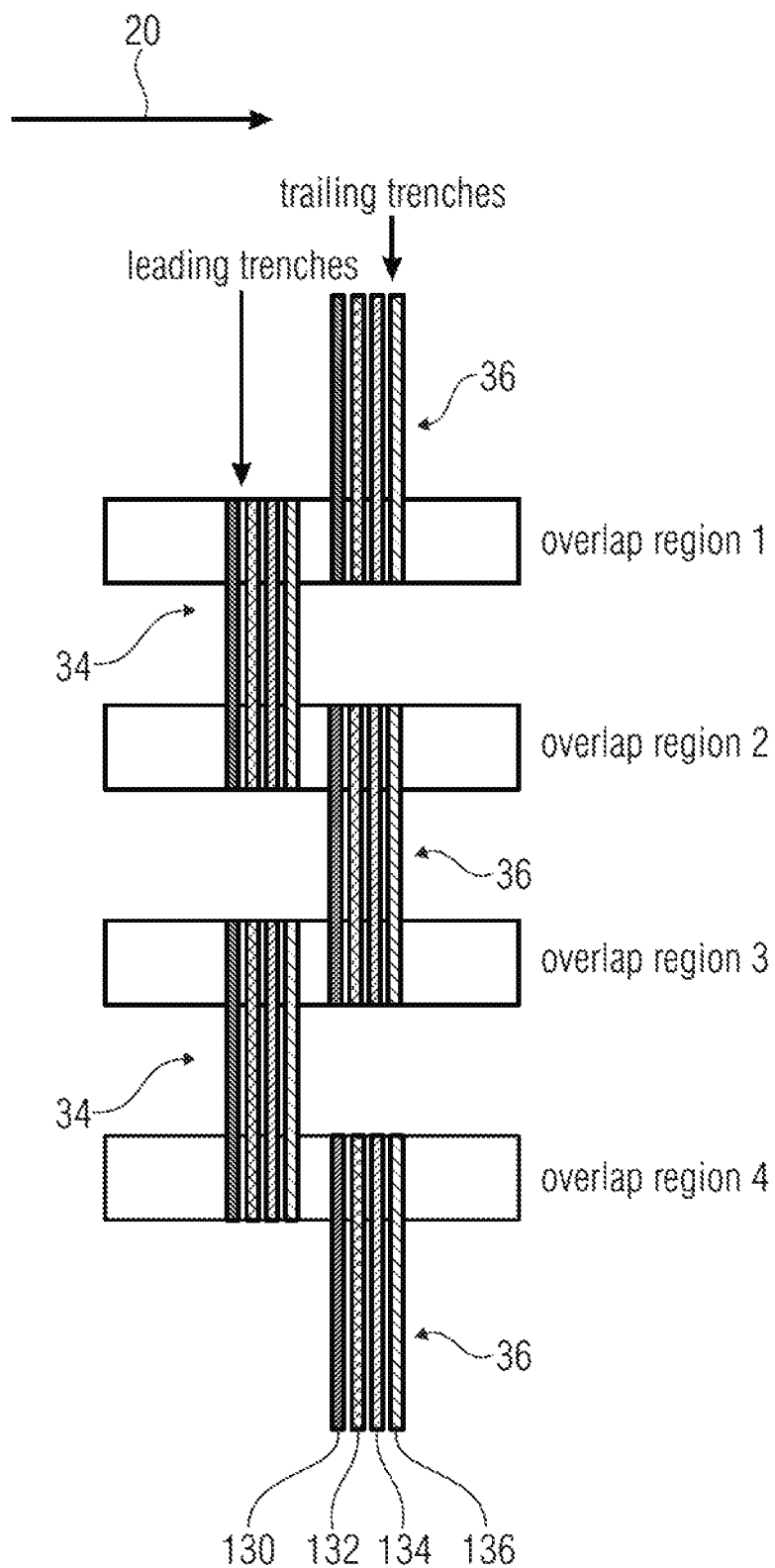
FIG. 7 a schematic view illustrating overlap regions in a printing apparatus having four rows of nozzles per printhead die according to an example.

In the following, reference is made to printhead dies comprising four slots (rows of nozzles) side-by-side in the order KMCY, i.e., a first slot for black, a second slot for magenta, a third slot for cyan and a fourth slot for yellow. FIG. 7 shows a schematic view of five dies comprising leading dies 34 and trailing dies 36. The terminology "leading" and "trailing" means the order in which the print medium passes the respective dies in the first direction. The print medium passes leading dies before passing trailing dies. The same terminology may be used in connection with slots (trenches) so that the medium passes leading trenches before passing trailing trenches. Overlap regions (numbered 1 to 4) between the respective dies are indicated in FIG. 7. Each die comprises a black slot 130, a magenta slot 132, a cyan slot 134 and a yellow slot 136 in this order.

As explained above with respect to FIGS. 5 and 6, it was recognized that TIJ defects may be highlighted in composite colors when the slots are of different ink colorants, such as magenta and yellow or black and cyan. The distance between the slots of both pairs may be the same and that the slots of both pairs may not be adjacent slots.

According to examples of the present disclosure, different weaving masks which may be based on complementary weaving masks are applied to slots associated with different colors and having trajectories of drops, which affect each other by TIJ winds. In examples, complementary weaving masks are applied to slots associated with different colors and having trajectories of drops, which affect each other by TIJ winds.

In the example shown in FIG. 7, complementary masks may be used for selected pairs of slots within the same die in order to avoid these slots to fire in the same positions at the same time. In examples, complementary masks are used for the magenta slot and the yellow slot. In examples, complementary masks may also be used for the black slot and the cyan slot. Using complementary masks permits separation of firing drops in time and this separation may contribute to minimize the effect of one drop on the trajectory of another. In examples, complementary weaving masks for the respective slots may be used along the whole print bar. In examples, the proposed complementary weaving masks may be used for magenta and yellow slots along the whole bar and/or the proposed complementary weaving masks may be used for black and cyan along the whole bar.

In examples, the complementary weaving masks applied to different slots on the same die may correspond to the weaving masks described above referring to FIGS. 4a and 4b.

FIG. 8a shows a schematic view of masks associated with magenta slots and FIG. 8b shows a schematic view of respective masks associated with magenta slots 132a to 132d and FIG. 8b shows a schematic view of respective masks associated with yellow slots 136a to 136d. In FIGS. 8a and 8b, the lowercase following the respective number indicates that the respective slots are arranged on the same die, i.e. slots 132a and 136a are arranged on the same die, slots 132b and 136b are arranged on the same die, slots 132c and 136c are arranged on the same die and slots 132d and 136d are arranged on the same die.

As shown in FIGS. 8a and 8b, complementary weaving masks 120 and 122 are applied to respective yellow slots and magenta slots arranged on the same die. Moreover, respective complementary weaving masks are applied to the respective magenta slots arranged on different dies and overlapping in the first direction.

Generally, each of a first die and a second die of a printhead, which overlap in the first direction, may have a first row of nozzles and a second row of nozzles arranged in this order, wherein a first weaving mask is used for the first row on the first die, a second weaving mask different from the first weaving mask is used for the second row on the first die, the second weaving mask is used for the first row on the second die, and the first weaving mask is used for the second row on the second die. The corresponding rows of the first die and the second die represent redundant rows in the overlapping area. This strategy may be applied to all dies of a print bar, such as those shown in FIG. 2 herein.

Figure 9A:
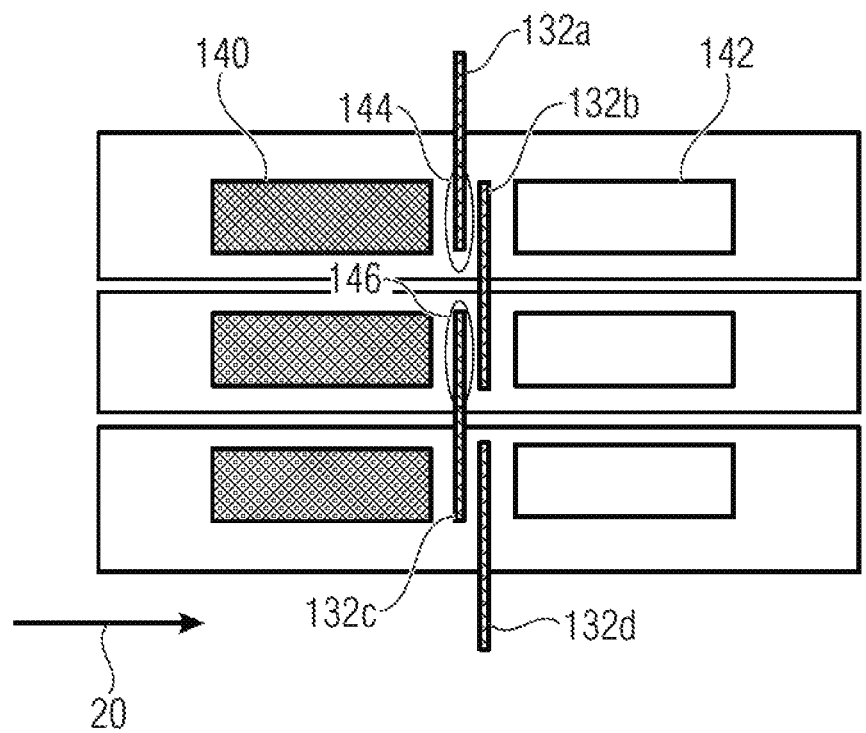
FIGS. 9a and 9b schematic views showing examples of weaving strategies for rows of nozzles of the same color in consecutive printhead dies.
Figure 9B:
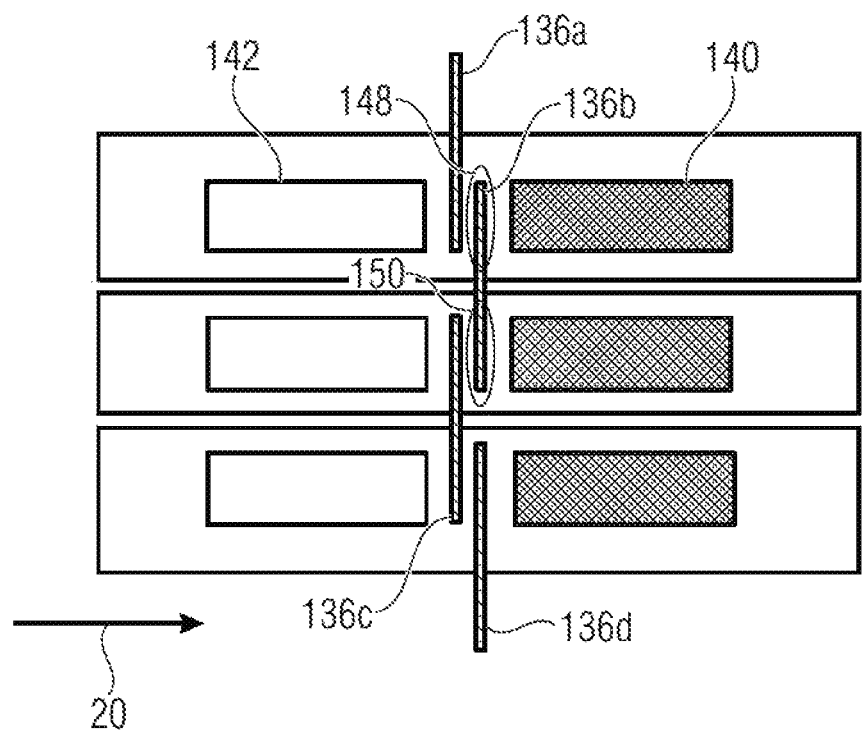

Another example of using complementary masks per conflictive slots to separate in time the moment on which they fire is shown in FIGS. 9a and 9b. In the example shown in FIGS. 9a and 9b, weaving masks 140 and 142 define that all nozzles of a respective slot are used for printing in the overlapping area. In the example shown in FIG. 9a, all bottom nozzles 144 of slot 132a are to be used for printing in the overlapping region with slot 132b and all top nozzles 146 of slot 132c are to be used for printing in the overlapping region with slot 132b. In FIG. 9b, all top nozzles 148 of slot 136b are to be used for printing in the overlapping region with slot 136a and all bottom nozzles 150 of slot 136b are to be used for printing in the overlapping region with slot 136c.

The example shown in FIGS. 9a and 9b represents an extreme pair of complementary weaving masks, which ignore nozzle redundancy in the overlap regions. Thus, the strategy described referring to FIGS. 9a and 9b may be regarded as full top and full bottom weave strategy. In examples, weaving masks may be applied so that the leading magenta slots are to fire all the ink in the overlap regions and the trailing yellow slots are to fire all the ink in the overlap regions along the whole bar. Thus, in this example, firing is not split between leading and trailing nozzles of slots in the overlap regions as in the previous strategies using half density patterns, as shown in FIGS. 4a and 4b, for example. It is clear from FIGS. 9a and 9b that the respective weaving masks associated with magenta slots and yellow slots on the same die are complementary. This is true for both the leading slots and the trailing slots. In examples, the masks between yellow and magenta may be swept, which will cause the trailing magenta trenches 132b and 132d to fire all the ink in the overlap regions and the leading yellow trenches 136a, 136c to fire all the ink in the overlap regions. In both examples, the same effect of mitigating the impact of TIJ winds can be obtained by minimizing the change in the air flow produced by the effect of firing drops, by minimizing the TIJ wind generated.

While the weaving masks shown in FIGS. 9a and 9b may be effective in addressing aerodynamic effects affecting the stitching area (overlapping region), same may not be especially robust to die alignment errors. Residual die alignment errors after a printhead alignment calibration may be in a range which is big enough to produce image quality defects affecting this area like grain, line branding and tone shift banding in parts of the image printed by nozzles in overlap regions (die stitching zones). For example, the residual positional errors may be in the order of +/−40 micrometer, which may be in the order of 1 dot depending on the ink architecture.

Thus, examples provide an extended strategy of the strategies described above with respect to FIGS. 9a and 9b. Since different weaving strategies produce different dot distributions in presence of die placement errors, the essence of a die stitching strategy is to find a (optimum) solution for printing two dot patterns partly on top of each other in such a way that the resulting image is predictable and robust to placement errors between the two patterns, as well as being visually close to the non-split pattern as printed outside the zone of die overlap.

Figure 10A:
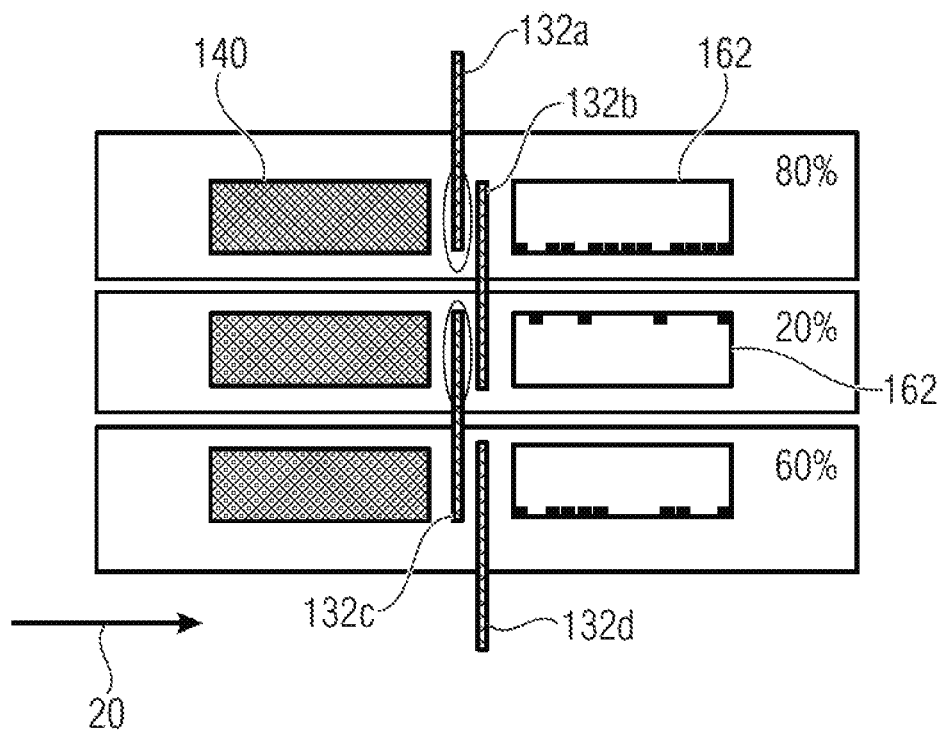
FIGS. 10a and 10b schematic views showing examples of weaving strategies of rows of columns of the same color in consecutive printhead dies.
Figure 10B:
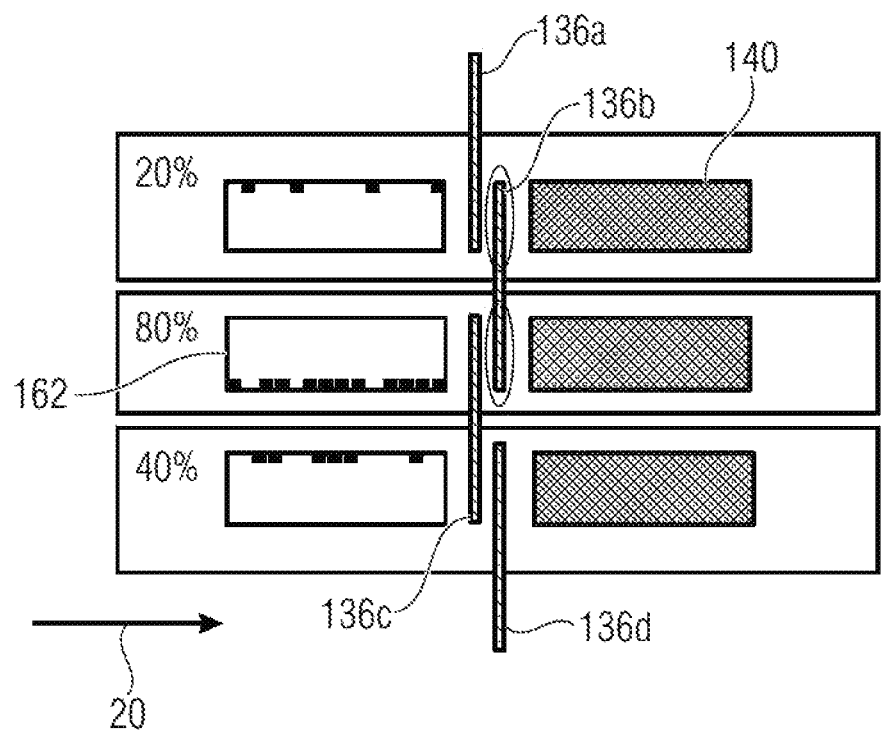

FIGS. 10a and 10b schematically show a refinement of the weaving strategy described above with respect to FIGS. 9a and 9b in order to make it robust to die placement errors. As shown in FIGS. 10a and 10b, weaving mask 140 remains unchanged. However, weaving masks 162 are no longer complete complementary to weaving mask 140, but are still based on a weaving mask complementary to weaving mask 140. The weaving masks 162 define that the respective first nozzle in the overlapping region of the corresponding slot (i.e., the nozzle adjacent to the non-overlapping region of the slot) is to be used for printing so that an extra additional dot is generated. As indicated in FIGS. 10a and 10b, the weaving masks 162 may define that the respective nozzle is to be used for printing some but not all of the number of adjacent drops in the first direction. To be more specific, the weaving mask may define that the nozzle is to be used for printing in a specific percentage of dots in the first direction, such as 20%, 40%, 60% or 80% as indicated in FIGS. 10a and 10b.

By adding additional extra drops as described above with respect to FIGS. 10a and 10b, the transition between dies may be made more uniform in case of position errors. Otherwise, if it is assumed that slot 132a has a pen axis deviation of −1 (corresponding to 1 dot in a direction perpendicular to the first direction), a blank line between the bottom most nozzle of slot 132a and the top most nozzle of slot 132b would be perceivable in the transition between dies 132a and 132b. This may represent the worst case and the approach described above tries to deal with this situation by randomly adding some extra drops using the nozzle in slot 132b, which corresponds to the last row in weaving mask 162 (the nozzle adjacent to the first nozzle of slot 132b not associated with the overlapping region). If the pen axis deviation of slot 132a with respect to slot 132b would be +1, then a row of the image would have double amount of ink when compared to the expected one. In this case, the extra additional dots also help to make the transition between the dies to be more uniform.

The number of rows where some extra drops will be fired and the density of drops fired in these rows may be determined by characterizing the system, ink and media interactions and misalignment errors.

Generally, the additional dots are added using the last nozzle (or nozzles) covered by the weaving mask and adjacent to the first nozzle not covered by the weaving mask, i.e., the first nozzle in the non-overlapping region (in case of no positional errors). In other words, a full top weave strategy may be enhanced by adding extra drops at a certain density to the top row(s) of the mask related to the die in which the bottom nozzles are part of the overlap region, while a full bottom weave strategy may be enhanced by randomly adding extra drops at a certain density in the bottom row(s) of the mask related to the die in which the top nozzles are part of the overlap region.

Accordingly, a refinement of completely complementary weaving masks may make them robust to die placement errors minimizing the impact of die transitions in the image quality in terms of area field uniformity. The refinement may include adding extra dots considering at least a nozzle redundancy of the size of the estimated size error. In the examples described, errors of just 1 dot are assumed. In other examples, errors of 2 dots may be considered, wherein the weaving mask may define that two nozzles of a respective slot at the end of the overlapping region bordering the non-overlapping region may be used to add extra dots.

Generally, in examples, the present disclosure provides a printing apparatus comprising a printhead and a controller, wherein the printhead includes dies, each die comprising rows of nozzles, wherein, in an overlapping region, the rows of nozzles of two dies overlap in a first direction. The first direction may be a direction, in which a relative movement between the printhead and a print medium takes place during operation of the printing apparatus. The controller is to apply a first weaving mask to a first row of nozzles of a first die and a second weaving mask to a second row of nozzles of the first die, the second weaving mask being different from the first weaving mask, the weaving masks defining, independent of print data, which of the nozzles of the corresponding row are to be used for printing in the overlapping region.

In examples, the first row of nozzles and the second row of nozzles are associated with different colors, i.e., are to print different colors. In examples, the first weaving mask and the second weaving mask are based on complementary weaving masks. In examples, the first weaving mask and the second weaving mask are complementary. In examples, the weaving masks define a straight border, wherein on one side of the border nozzles of one of the first and second rows are used, and on the other side of the border nozzles of the other one of the first and second rows are used. An example for such weaving masks is shown in FIG. 4a.

In examples, the first weaving mask defines that, beginning at the end of the first row, a gradually decreasing number of nozzles of the first row is used for printing in the overlapping area, and a second weaving mask defines that, beginning at the end of the second row, a gradually increasing number of nozzles of the second row is used for printing in the overlapping area. An example for such weaving masks is shown in FIG. 4b of the present disclosure.

In examples, the first weaving mask defines that all nozzles of the first row are to be used for printing in the overlapping area and the second weaving mask defines that the nozzles of the second row are not to be used for printing in the overlapping area. Samples of such weaving masks are described referring to FIGS. 9a and 9b in the present disclosure.

In examples, the first weaving mask defines that all nozzles of the first row are used for printing in the overlapping area, and the second weaving mask defines that one of the nozzles of the second row at one end of the overlapping area is used for printing and the remaining nozzles of the second row are not used for printing in order to correct an error determined by characterizing the printing apparatus. In such examples, the weaving masks may define which of the nozzles of the corresponding row is to be used for printing in the overlapping region for a number of adjacent drops in the first direction, wherein the second weaving mask defines that the one of the nozzles of the second row is used for printing some but not all of the number of adjacent drops in the first direction. Examples of such weaving masks are described referring to FIGS. 10a and 10b.

In examples, the first die comprises a third row of nozzles arranged between the first row of nozzles and the second row of nozzles. In examples, the first die comprises a fourth row of nozzles, wherein the second row of nozzles is arranged between the third row of nozzles and the fourth row of nozzles, wherein the controller is to apply a third weaving mask to the third row of nozzles and a fourth weaving mask to the fourth row of nozzles, wherein the third weaving mask is different from the fourth weaving mask. In examples, the first to fourth rows are to print different colors.

In examples, the controller is to apply the first weaving mask to a second row of nozzles of a second die and the second weaving mask to a first row of nozzles of the second die, wherein the rows of nozzles of the first and second die overlap in the first direction, and wherein the first row of nozzles of the second die is redundant to the first row of nozzles of the first die and the second row of nozzles of the second die is redundant to the second row of nozzles of the first die.

Figure 11:
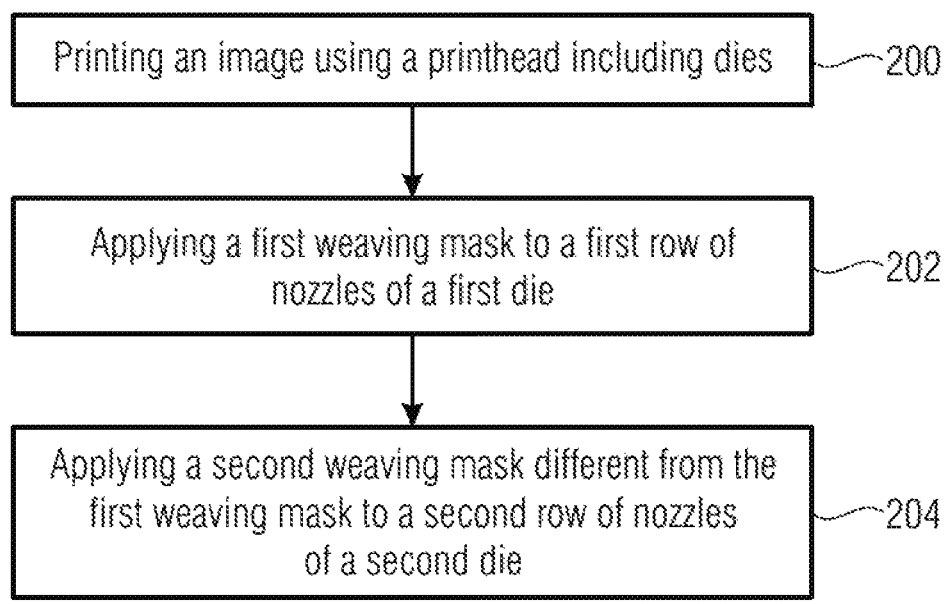
FIG. 11 a schematic view of an example of a method according to the disclosure.

Examples described herein relate to a method as shown in FIG. 11. The method comprises printing an image using a printhead including dies, 200 in FIG. 11. Each die comprises rows of nozzles, wherein, in an overlapping region, the rows of nozzles of two dies overlap in a first direction. The first direction may be a direction in which a relative movement between the printhead and a print medium takes place. The printing comprises applying a first weaving mask to a first row of nozzles of a first die, 202 in FIG. 11. The printing further comprises applying a second weaving mask to a second row of nozzles of the first die, which is different from the first weaving mask, 204 in FIG. 11. The weaving masks define, independent of print data, which of the nozzles of the corresponding row is to be used for printing in the overlapping region.

In such a method, the first weaving mask and the second weaving mask be based on complementary weaving masks or may represent complementary weaving masks. The first weaving mask may define that all nozzles of the first, row are used for printing in the overlapping area, and the second weaving mask may define that one of the nozzles of the second row at one end of the overlapping area is used for printing and the remaining nozzles of the second row are not used for printing in order to correct an error determined by characterizing a printing apparatus. In such a method, the weaving masks may define which of the nozzles of the corresponding row is to be used for printing in the overlapping region for a number of adjacent drops in the first direction, wherein the second weaving mask may define that redundant nozzles are to be used for printing some but not all of the number of adjacent drops in the first direction.

Examples provide a non-transitory computer-readable storage medium including instructions that, when executed on a processor, cause the processor to: control a printing apparatus to print an image using a printhead including dies, each die comprising rows of nozzles, wherein, in an overlapping region, the rows of nozzles of two dies overlap in a first direction. The first direction may be a direction in which a relative movement between the printhead and a print medium takes place. The printing comprises: applying a first weaving mask to a first row of nozzles of a first die, and applying a second weaving mask to a second row of nozzles of the first die, the second weaving mask being different from the first weaving mask, the weaving masks defining, independent of print data, which of the nozzles of the corresponding row is to be used for printing in the overlapping region.

As explained above, thermal ink jet wind caused by one slot may affect the trajectory of drops from another slot in the same die. The interference may depend on the distance of the slots on the die. Samples of the teaching herein may include determining slots (rows of nozzles) affected by thermal ink jet winds and applying the different weaving masks to the slots determined in this manner. Thus, in examples, the first row of nozzles and the second row of nozzles, which the first and second weaving masks are applied to, are rows of nozzles determined to be conflicting rows of nozzles. Conflicting rows of nozzles are rows of nozzles, in which drops ejected from one of the rows of nozzles affect the trajectory of drops fired from the other of the rows of nozzles.

Examples of the disclosure describe a solution implemented in machine readable instructions to address a specific image quality defect affecting areas of an image printed by nozzles in overlap regions between staggered dies of multi-die printheads, such as in 1-pass print-modes where the image is printed in a continuous media movement. The defects mitigated by examples herein may manifest in dies with more than one trench or slot of nozzles, where the ink interaction in time and space may be maximum. In this environment, drops fired from one of the slots together with the media motion may produce airflows affecting the trajectory of the drops fired from another slot. As a result, the air flow generated may make the drops split into satellites and fall down at unexpected positions causing a very visible artefact that is mitigated using examples disclosed herein.

Air flows may affect the whole die swath in different manners. Different aerodynamic effects may appear in the central part of the die and at the end of the die. The defect that occurs at the extremes of the dies is particularly disturbing because the die stitching zones or overlap regions between consecutive staggered dies are susceptible to image quality defects, wherein examples described wherein concern the image quality in these zones. Examples described herein propose to correlate the weaving strategies between slots of nozzles within the same die affected by the aerodynamic phenomenon. In examples, by means of using complementary masks for those slots at a certain distance, one may change the airflow in a way that the influence to dots fired by the other is reduced. This may address the air dynamic defect affecting the switching zone by reducing, at best minimizing, the impact of air flows on the image quality of the printed plots.

In examples, usage of different weaving masks for magenta and yellow slots have been described. The same strategy could be used for other pairs of slots within the same die and of different colorants affected by the same phenomenon, like for black and cyan slots, for example. Examples propose to correlate the weaving strategies between rows of nozzles (usually of different colorants) within the same die, those slots generating the TIJ wind and those suffering their consequences. In examples, the weaving masks are to separate in time drops fired by the two slots, thereby minimizing the generation of TIJ wind causing the described artefact. Examples may achieve fill uniformity and image quality in general in 1-pass printing. Examples may permit a straightforward implementation with simple changes to the present masking pipeline only. Examples may be implemented without additional run time overhead, without increase in material cost, and without ink or hardware components architecture review. Examples may be applied to all printers having a pen architecture comprising overlapping printhead dies no matter of the printer platform.

Although some aspects of the techniques described herein have been described in the context of an apparatus, these aspects may also represent a description of corresponding method blocks. Analogously, aspects described in the context of a method also represent a description of corresponding blocks or items or features of a corresponding apparatus.

All of the features disclosed in this specification, including any accompanying claims, abstract and drawings, and/or all of the method blocks or processes disclosed, may be combined in any combination, except combinations where at least some of the features are mutually exclusive. Each feature disclosed in this specification, including any accompanying claims, abstract and drawings, may be replaced by features serving the same, equivalent or similar purpose, unless expressly stated otherwise. Thus, unless expressly stated otherwise, each feature disclosed is an example of a generic series of equivalent or similar features.

Examples relate to a non-transitory machine-readable storage medium encoded with instructions executable by a processing resource of a computing device to perform methods described herein. Examples described herein can be realized in the form of hardware or a combination of hardware and machine readable instructions. Any such machine readable instructions may be stored in the form of volatile or non-volatile storage, such as a storage device like a ROM, whether erasable or rewritable or not, or in the form of memory, such as RAM, memory chips, device or integrated circuits or an optically or magnetically readable medium, such as a CD, DVD, magnetic disc or magnetic tape. The storage devices or storage media are examples of machine-readable storage that are suitable for storing a program or programs that, when executed, implement examples described herein.

The foregoing has described the principles in examples and modes of operation. However, the teaching herein should not be construed as being limited to the particular examples described. The above described examples should be regarded as illustrative rather than restrictive, and it should be appreciated that variations may be made in those examples without departing from the scope as defined by the following claims.

The invention claimed is:

1. A printing apparatus comprising:
a printhead including dies, each die comprising rows of nozzles, wherein, in an overlapping region, the rows of nozzles of two dies overlap in a first direction, in which a relative movement between the printhead and a print medium takes place during operation of the printing apparatus; and
a controller to:
apply a first weaving mask to a first row of nozzles of a first die and a second weaving mask to a second row of nozzles of the first die, the second weaving mask being different from and complementary to the first weaving mask, the weaving masks defining, independent of print data, which of the nozzles of the corresponding row are to be used for printing in the overlapping region.

2. The printing apparatus of claim 1, wherein the weaving masks define a straight border, wherein on one side of the border nozzles of one of the first and second rows are to be used, and on the other side of the border nozzles of the other one of the first and second rows are to be used.

3. The printing apparatus of claim 1, wherein the first weaving mask defines that, beginning at the end of the first row, a gradually decreasing number of nozzles of the first row is to be used for printing in the overlapping area, and the second weaving mask defines that, beginning at the end of the second row, a gradually increasing number of nozzles of the second row is to be used for printing in the overlapping area.

4. The printing apparatus of claim 1, wherein the first weaving mask defines that all nozzles of the first row are to be used for printing in the overlapping area, and wherein the second weaving mask defines that the nozzles of the second row are not to be used for printing in the overlapping area.

5. The printing apparatus of claim 1, wherein the first weaving mask defines that all nozzles of the first row are to be used for printing in the overlapping area, and wherein the second weaving mask defines that one of the nozzles of the second row at one end of the overlapping area is to be used for printing and the remaining nozzles of the second row are not to be used for printing in order to correct an error determined by characterizing the printing apparatus.

6. The printing apparatus of claim 5, wherein the weaving masks define which of the nozzles of the corresponding row is to be used for printing in the overlapping region for a number of adjacent drops in the first direction, wherein the second weaving mask defines that the one of the nozzles of the second row is to be used for printing some but not all of the number of adjacent drops in the first direction.

7. The printing apparatus of claim 1, wherein the controller is to apply the first weaving mask to a second row of nozzles of a second die and the second weaving mask to a first row of nozzles of the second die, wherein the rows of nozzles of the first and second die overlap in the first direction, and wherein the first row of nozzles of the second die is redundant to the first row of nozzles of the first die and the second row of nozzles of the second die is redundant to the second row of nozzles of the first die.

8. The printing apparatus of claim 1, wherein the first die comprises a third row of nozzles arranged between the first row of nozzles and the second row of nozzles.

9. The printing apparatus of claim 8, wherein the first die comprises a fourth row of nozzles, wherein the second row of nozzles is arranged between the third row of nozzles and the fourth row of nozzles, wherein the controller is to:
apply a third weaving mask to the third row of nozzles and a fourth weaving mask to the fourth row of nozzles, wherein the third weaving mask is different from the fourth weaving mask.

10. The printing apparatus of claim 1, wherein the first weaving mask is applied to the first row of nozzles of the first die and not to the second row of nozzles of the first die, and the second waving mask is applied to the second row of nozzles of the first die and not to the first row of nozzles of the first die.

11. A method comprising:
printing an image using a printhead including dies, each die comprising rows of nozzles, wherein, in an overlapping region, the rows of nozzles of two dies overlap in a first direction, in which a relative movement between the printhead and a print medium takes place, the printing comprising:
applying a first weaving mask to a first row of nozzles of a first die; and
applying a second weaving mask to a second row of nozzles of the first die,
the second weaving mask being different from and complementary to the first weaving mask, the weaving masks defining independent of print data which of the nozzles of the corresponding row is to be used for printing in the overlapping region.

12. The method of claim 11, wherein the first weaving mask defines that all nozzles of the first row are to be used for printing in the overlapping area, and wherein the second weaving mask defines that one of the nozzles of the second row at one end of the overlapping area is to be used for printing and the remaining nozzles of the second row are not to be used for printing in order to correct an error determined by characterizing a printing apparatus.

13. The method of claim 11, wherein the weaving masks define which of the nozzles of the corresponding row is to be used for printing in the overlapping region for a number of adjacent drops in the first direction, wherein the second weaving mask defines that the one of the nozzles of the second row is to be used for printing some but not all of the number of adjacent drops in the first direction.

14. The method of claim 11, wherein the first weaving mask is applied to the first row of nozzles of the first die and not to the second row of nozzles of the first die, and the second waving mask is applied to the second row of nozzles of the first die and not to the first row of nozzles of the first die.

15. A non-transitory computer-readable storage medium including instructions that, when executed on a processor, cause the processor to:

control a printing apparatus to print an image using a printhead including dies, each die comprising rows of nozzles, wherein, in an overlapping region, the rows of nozzles of two dies overlap in a first direction, in which a relative movement between the printhead and a print medium takes place during operation of the printing apparatus, the printing comprising:

applying a first weaving mask to a first row of nozzles of a first die; and applying a second weaving mask to a second row of nozzles of the first die, the second weaving mask being different from and complementary to the first weaving mask, the weaving masks defining independent of print data which of the nozzles of the corresponding row is to be used for printing in the overlapping region.

16. The non-transitory computer-readable data storage medium of claim 15, wherein the first weaving mask is applied to the first row of nozzles of the first die and not to the second row of nozzles of the first die, and the second waving mask is applied to the second row of nozzles of the first die and not to the first row of nozzles of the first die.

* * * * *